June 28, 1949.  R. A. McCLOUD ET AL  2,474,542
VULCANIZER MOLD

Filed March 26, 1945  8 Sheets-Sheet 1

INVENTORS
ROBERT A. McCLOUD, JOHN L. DAUM
THOMAS P. BACON
BY George B White
ATTORNEY June 28, 1949. R. A. McCLOUD ET AL 2,474,542
VULCANIZER MOLD Filed March 26, 1945 8 Sheets-Sheet 3

INVENTORS
ROBERT A. McCLOUD, JOHN L. DAUM
THOMAS P. BACON
BY George B White
ATTORNEY INVENTORS
ROBERT A. McCLOUD, JOHN L. DAUM
THOMAS P. BACON
BY George B White
ATTORNEY June 28, 1949.　　　　R. A. McCLOUD ET AL　　　　2,474,542
VULCANIZER MOLD Filed March 26, 1945　　　　　　　　　　　　　　8 Sheets-Sheet 5

INVENTORS
ROBERT A. McCLOUD, JOHN L. DAUM
THOMAS P. BACON
BY George B. White
ATTORNEY

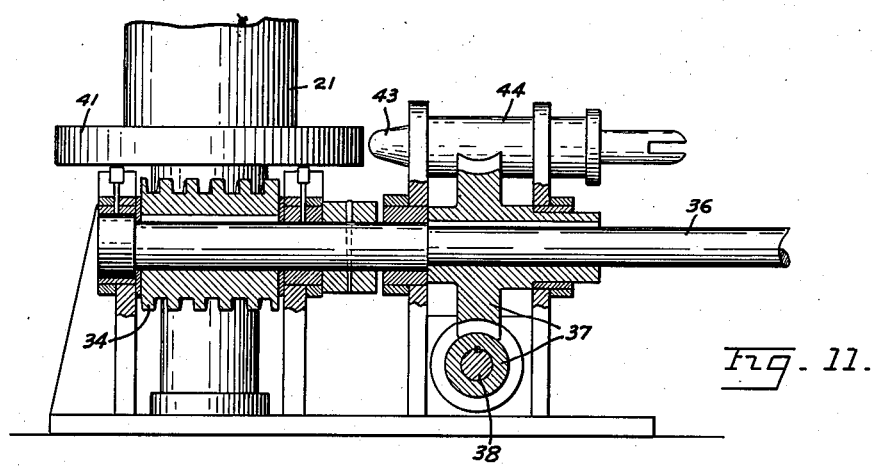
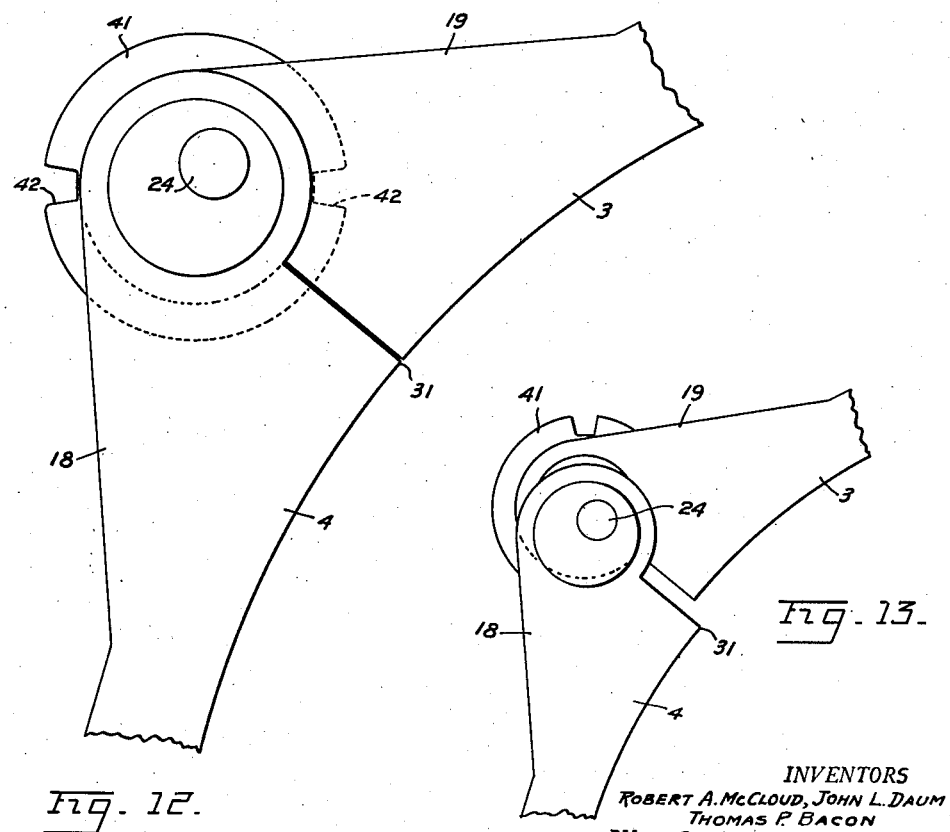

June 28, 1949. R. A. McCLOUD ET AL 2,474,542
VULCANIZER MOLD

Filed March 26, 1945 8 Sheets-Sheet 7

INVENTORS
ROBERT A. McCLOUD, JOHN L. DAUM
THOMAS P. BACON
BY George B. White
ATTORNEY

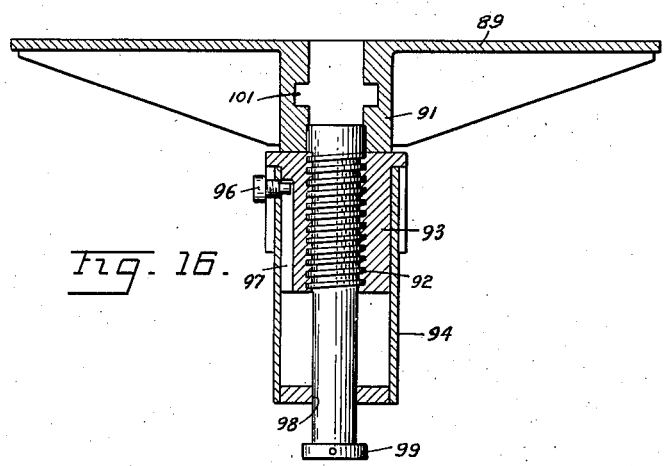
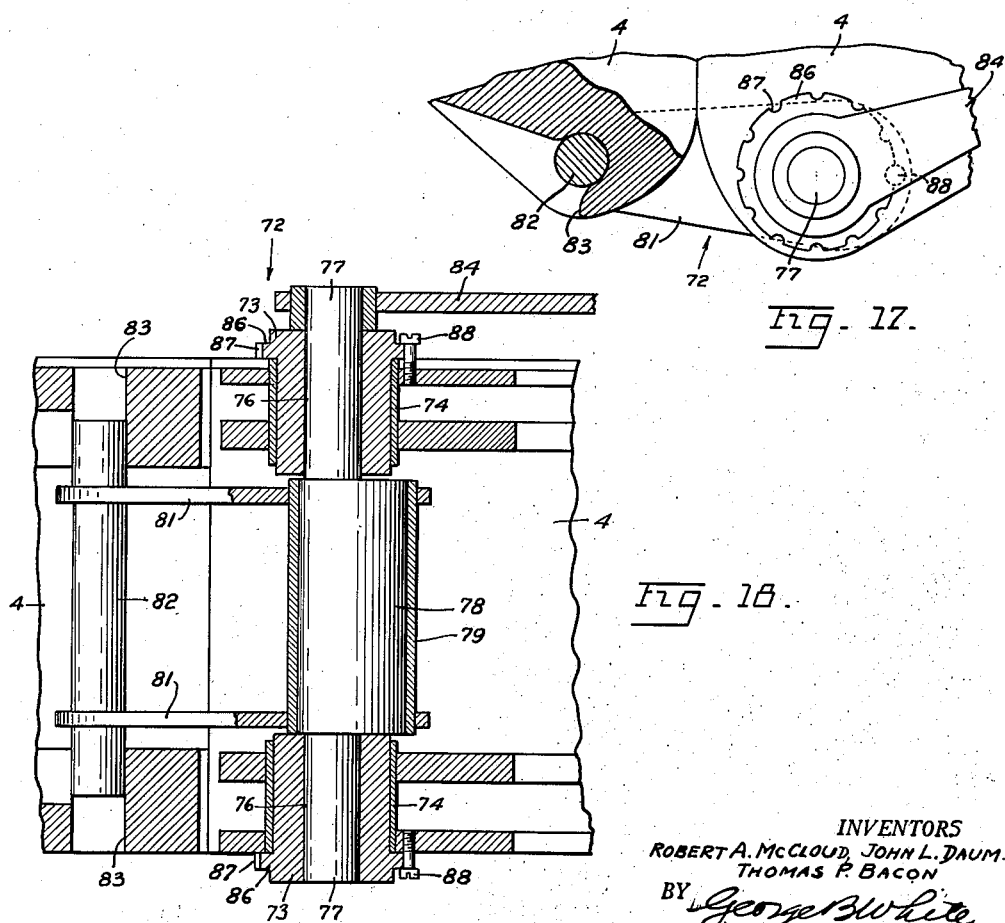

Patented June 28, 1949

2,474,542

UNITED STATES PATENT OFFICE 2,474,542

VULCANIZER MOLD

Robert A. McCloud, San Lorenzo, and John L. Daum and Thomas P. Bacon, Oakland, Calif.

Application March 26, 1945, Serial No. 584,911

21 Claims. (Cl. 18—18)

This invention relates to a vulcanizer mold.

The primary object of this invention is to provide a mold which greatly facilitates the vulcanizing of articles, and particularly the vulcanizing of tires, and in which the sticking of the vulcanized tire to the surfaces of the mold is obviated, and the opening and closing of which is balanced and utilized to improve the removal and insertion of the tire out of and into the mold.

A feature of this invention is the utilizing of relatively movable sections of the mold for separating a vulcanized tire from the respective vulcanizing surfaces of the mold sections.

Another feature of this invention is the opening and closing of the movable sections of a full circle mold so as to equalize the forces on the same.

Other features of this invention are: the automatic control of hinge elements of a sectional mold so as to readily move the same toward or away from the tire; easily controlled full opening and closing of the mold; positive clamping of the wing sections of the mold; simplicity of construction; power control of side plates, and flexibility of adjustments.

We are aware that some changes may be made in the general arrangement and combinations of the several devices and parts, as well as in the details of the construction thereof without departing from the scope of the present invention as set forth in the following specification and as defined in the following claims; hence we do not limit this invention to the exact arrangements and combinations of the said device and parts as described in the said specification, nor do we confine ourselves to the exact details of the construction of the said parts as illustrated in the accompanying drawings.

With the foregoing and other objects and features in view, which will be made manifest in the following detailed description, reference is had to the accompanying drawings for the illustrative embodiment of the invention, wherein:

Fig. 11 is a sectional view of the hinge shifting mechanism.

Fig. 12 is a fragmental plan view of the shifting hinge when the mold sections are in aligned closed position.

Fig. 13 is a fragmental plan view of the mold showing the movable section shifted inwardly relatively to the stationary section.

Fig. 16 is a sectional view of the adjustable bottom plate for the mold.

Fig. 17 is a fragmental view showing the fastening mechanism for the wing sections of the mold and Fig. 18 is a sectional view of said fastening mechanism.

Figure 1:
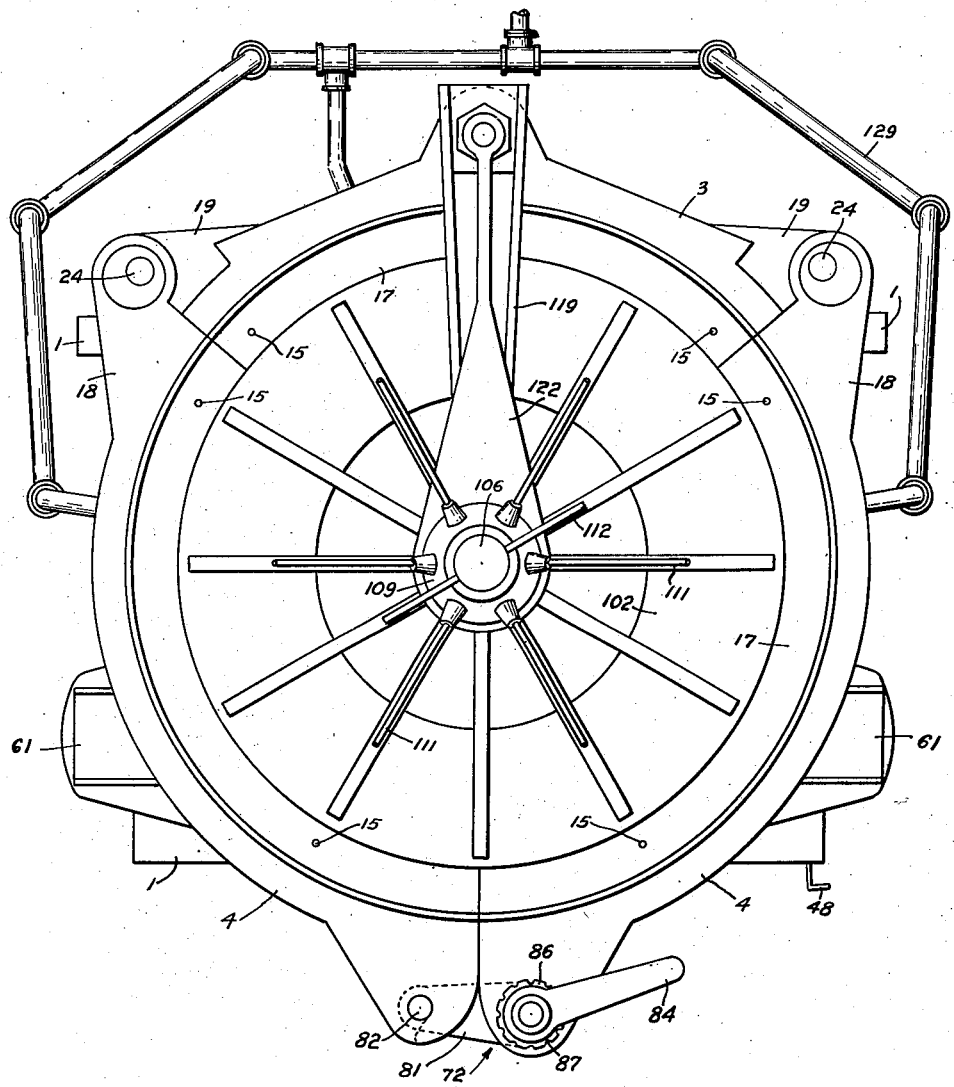
Fig. 1 is a plan view of a mold constructed in accordance with this invention.

In the preferred embodiment of the invention the mold rests on a base I having suitable legs 2. On the top of the base is supported a stationary mold section 3. At the ends of the stationary mold section 3 are wing sections 4 mounted in a manner hereinafter described. The sections 3 and 4 are complemental and arcuate so that when the wing sections are closed a full circle mold is formed.

Each of the sections 3 and 4 are preferably fabricated as a welded steel structure which consists of an inner arcuate plate 6, a parallel outer arcuate plate 7 spaced from the inner plate 6 so as to form a chamber between said plates. A bottom plate 8 closes the bottom of the space between the arcuate plates 6 and 7. A top plate 9 closes the top of the space between said arcuate plates 6 and 7. End plates 10 close the ends of said space. Intermediate partition plates 11 in the space between said arcuate plates 6 and 7 divide the said space into three longitudinal chambers, 12, 13 and 14 respectively from the bottom to the top. At the respective alternate ends of said partition plates 11 are provided suitable perforations to allow the continuous passage of the steam from one chamber to the next. The upper chamber 14 is the inlet chamber through which the steam or other heating medium is introduced. The lowest chamber 12 is connected to a suitable outlet 16 to drain off said heating medium. The plates and partitions are integrally united by welding or the like. From the bottom plate 8 extends inwardly a supporting flange 17 in the form of a ring on which suitable matrices rest. These flanges 17 have upwardly extending locating pins 15 thereon for cooperation with corresponding holes in the bottoms of the matrices, thereby to locate and hold said matrices in alignment with the respective mold sections.

The eccentric or shifting hinge connection between each wing section 4 and the stationary section 3 is accomplished by overlapping bearing brackets 18 and 19 extended from the end of each wing section 4 and from the adjacent end of the stationary section 3. In each bearing bracket 18 and 19 is provided a cylindrical bearing 21. Said bearings 21 in the normal closed position of the mold are coaxial. In each bearing 21 is an eccentric cam 22. A hole 23 extends through all the cams 22 parallel with the axis but off-set from the center of each cam 22. An eccentric or crank shaft 24 is extended through said holes 23. It is to be noted that the hole in the cam 22 in the lowest bracket 19 has an offset portion 26 which is aligned with the other eccentric holes 23, but the other portion 27 of said hole is aligned with the true axis of the hinge and of the cams 22. The lower end of the crank shaft 24 terminates in a drive shaft 28 which latter is off-set with respect to the eccentricity of the holes 23 but is aligned with the true axis of the bearings 21.

Figure 7:
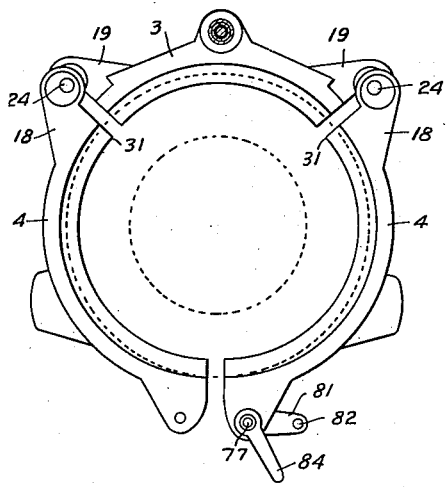
Fig. 7 is a somewhat diagrammatic view of the mold in partly closed position.
Figure 8:
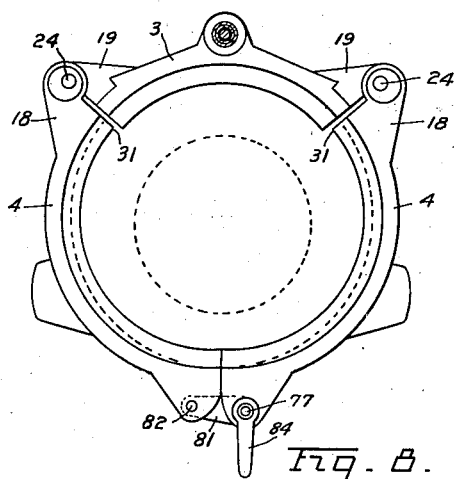
Fig. 8 is a somewhat diagrammatic plan view of the mold showing the hinged ends of the wing sections shifted outwardly of the mold and drawing the tire against the stationary section.

The eccentric cams 22 in the bearing brackets 18 of the wing sections 4 are connected by suitable keys or set-screws 29 to the respective bearings 21 on the bracket 18. The eccentric cams 22 in the alternate bearings 21 on the stationary brackets 19 are keyed by suitable keys 30 to the crank shaft 24. When rotation is transmitted to the drive shaft 28, it turns the eccentric or crank shaft 24 around the axis of rotation of said drive shaft 28. The cams 22 and the bearings 21 of the stationary brackets 19 rotate with the eccentric shaft 24 around the axis of rotation of the drive shaft 28. The cams 22 and the bearings 21 of the wing brackets 18 are not rotatable and the eccentric movement of the eccentric shaft 24 around the axis of rotation of the drive shaft 28 will push the bearings 21 on the brackets 18 as well as the wing sections 4 at said hinge so that the hinges of said wing sections 4 move substantially on a circular path defined by the shifting of the center of the eccentric shaft 24 around the axis of the drive shaft 28. This rotation is in a clockwise direction viewing Figs. 12 and 13. The cams at the left hand hinge in Figs. 5 to 8 inclusive rotate clockwise, the cams at the right of said figures rotate contra-clockwise. In the normal closed position of the wing sections 4 the eccentric shaft 24 is in the position shown in Fig. 12. As the eccentric shaft 24 and the cams 22 in the bearings 21 of the wing section brackets 18 are rotated about a quarter of a revolution, the hinged portions of the wing sections 4 are shifted radially inwardly of the mold along the edge of the stationary mold and also slightly away from the stationary mold so that the corner 31 on the inside of the hinged end of each wing section 4 is pushed inwardly, thereby to move the corresponding corner of the matrix to engage the tire and force it away from the matrix in the stationary mold section 3. This first ninety degrees rotation will bring the inner mold corner 31 to its innermost position in the mold. The next consecutive ninety degrees of rotation will move the inner corner of each wing section 4 outwardly in alignment with but still spaced from the adjacent corner of the stationary section 3. After this shifting the wing sections 4 are opened at the free end so as to free the tire from said wing sections. When a new tire is placed in the mold and the wing sections 4 are again closed, as shown in Fig. 7, the rotation of the drive shaft 28 and of the eccentric shaft 24 is continued and during the next or third ninety degrees of rotation the inner corner 31 of the wing section 4 is pulled outwardly of the mold and toward the adjacent corner of the stationary section 3 substantially into the position shown in Fig. 8 and pulls the wing sections 4 together so that the closing of the wing sections 4 firmly draws and presses the tire against the matrix in the stationary mold 3. The final ninety degrees rotation of said drive shaft 28 and of the eccentric shaft 24 returns the hinge connection of the wing sections to the initial closed position, namely it moves the inner corners of the wing sections 4 inwardly of the mold and into alignment with the respective adjacent corners of the stationary section 3 and in close relationship with said last corners, resulting in firm engagement of the tire by the matrices in all the mold sections.

The rotation of the drive shaft 28 for shifting the hinges of the wing sections 4 in the manner heretofore described, is accomplished in two movements, 180 degrees each. The first part during the opening of the mold consists, of the first two ninety degree shifts to the point illustrated in Figs. 5 and 6. The second 180 degrees turn includes the last two ninety degree shifts to the position shown in Fig. 8 and the return from there into the aligned position shown in Fig. 12. For accomplishing the rotative movement uniformly the lower end of the drive shaft 28 is supported in a bearing bracket 32. A gear 33 is keyed on the drive shaft 28 and is in mesh with a worm 34, which in turn is driven by a horizontal shaft 36. Rotation of the horizontal shaft 36 is imparted by a worm and gear transmission 37 through a motor shaft 38 driven by a suitable electric motor 39. The horizontal shaft 36 simultaneously rotates both worms 34 at both ends of the stationary section 3. The worm 34 at one end is a right hand worm and at the other end is a left hand worm. On the lowermost cam 22 at each hinge is provided a circular flange 41 which has diametrically opposite notches 42 in its periphery. A catch 43 is slidably supported in a housing 44 adjacent each flange 41 and is pressed by a suitable spring 46 toward the periphery of the flange 41 for engagement with the respective notches 42. Inasmuch as the notches 42 are 180 degrees apart, the catches 43 stop the respective flanges 41 and the shifting of the respective hinges after each 180 degree turn.

Figure 9:
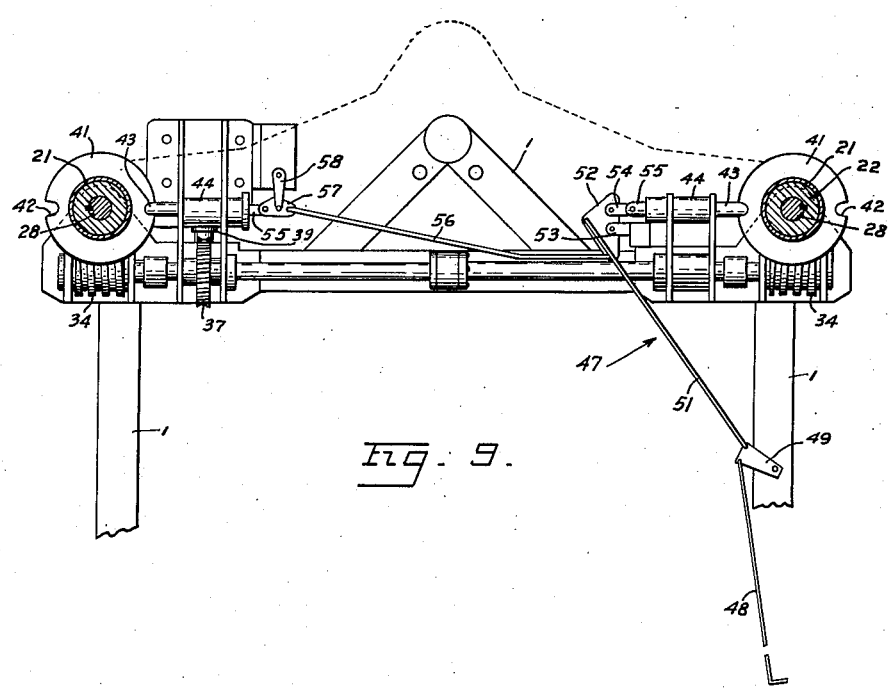
Fig. 9 is a rear view of the mold and the actuating and operating mechanism for the shifting of the mold hinges.
Figure 10:
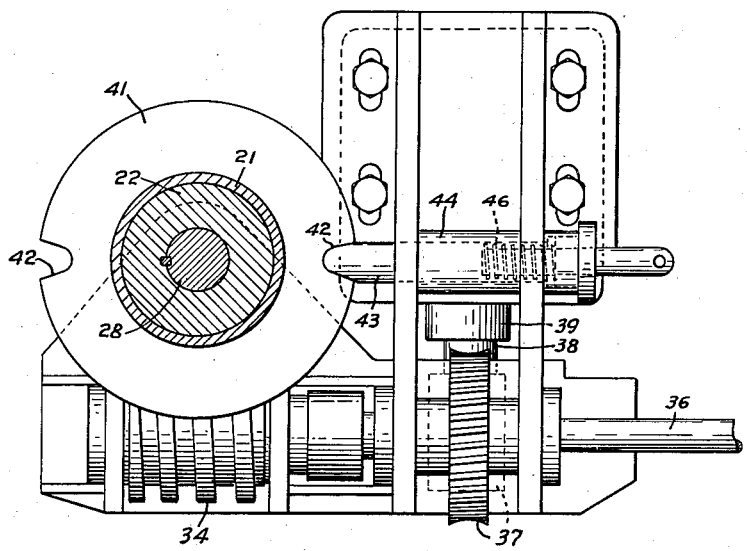
Fig. 10 is an enlarged view of the mechanism for said shifting of the hinges.

A system of links 47 is used for the purpose of withdrawing the catches 43 from the respective notches 42 and for simultaneously closing the circuit of the electric motor 39 for the 180 degree rotative shifting of said hinges. This system of links 47 includes an operating lever 48 extended to a convenient part of the mold for manipulation for the operator. This lever 48 is connected to a link pivot 49. A link 51 is pivoted at one end to the link pivot 49 and its other end to a short lever 52. This short lever 52 is pivoted on a suitable bracket 53 adjacent to one of the control mechanisms as shown in Fig. 9. The short lever 52 is connected by a short link 54 to the forked end 55 of the adjacent catch 43. To the end of the short lever 52 on the other side of its pivot bracket 53 is pivoted another connecting link 56 which is suitably bent so that its other end is pivoted to a link plate 57, which latter is pivoted to the forked end 55 of the other catch 43 as shown in Fig. 9. A switch handle 58 is connected to the link plate 57 to be moved thereby in opposite directions according to the operation of the system of links 47. The switch 58 may be of any suitable construction, but it is so adjusted that when the system of links 47 is moved for withdrawing the catches 43 from the respective notches 42, then it closes the circuit of the electric motor 39 for the rotation of the respective hinges. When the catches 43 snap into the notches 42 after 180 degrees rotation, then the following movement of the system of links 47 moves the switch 58 back into the normally circuit-breaking position. When the operator pulls the operating lever 48 the system of links 47 turns the short lever 52 and pulls the link plate 57 so as to withdraw the catches 43 from the respective notches 42 and simultaneously to move the switch handle 58 to close the motor circuit. After the flanges 41 are rotated with the shifting hinges 180 degrees and the opposite notches 42 are aligned with the respective catches 43, the springs 46 push the catches 43 into these notches 42 and thereby pull the system of links 47 in the opposite direction, which movement will also return the switch 58 into circuit breaking positions. Thus the uniform shifting of the hinges at each operation is assured.

In other words the eccentric shaft 24 and the drive shaft 28 constitute a two-throw crank shaft which when rotated, moves the off-center shaft 24 with the cams 22 in the lowest bearing 21 and in the second bearing 21 from the top, so that the cams 22 in said bearings 21 are rotated. The same action throws the other cams 22 in the other bearings 21 so as to circularly displace the top bearing 21 and the third bearing 21 from the top of the hinge in such a way as to shift the connected end of the wing section 4 relatively to the end of the stationary section 3 in the manner heretofore described. It is to be noted that during this operation of the shifting of the hinged end of the wing sections 4, said wing sections 4 are preferably held together at their adjacent free ends. The tire is therefore moved bodily with the wings, so as to move the tire away from and toward the matrix in the stationary section respectively during the first and second shifting cycles of the hinge connections.

Each wing section 4 has a base bracket 61 mounted on the under side of its bottom plate 8 which brackets 61 extend inwardly so as to ride on the base 1 of the mold and prevent the downward sagging of said wing sections 4. Each base bracket 61 may be located in any suitable place, but in the present illustration each bracket 61 is spaced substantially midway between the ends of each wing section 4. To these base brackets 61 are suitably secured the opposite ends of a pneumatic or hydraulic mold opening or closing mechanism 62. This mechanism 62 is of the free-floating type, namely the elements of the mechanism 62 are supported on the respective base brackets 61 of the wing sections 4. This mechanism 62 includes a cylinder 63 and a plunger 64 suitably working in the cylinder 63. The working of the plunger 64 in the cylinder 63 is preferably of the double action type and is controlled by any suitable valve mechanism not shown. The outer end of the cylinder 63 is pivotally connected by means of a lug 66 on a shaft 67 extended from a boss 68, on the under side of the base bracket 61. A nut 69 holds the lug 66 in place. The outer end of the plunger 64 is similarly connected by a lug 66 to another boss 68 on the base bracket 61 of the other wing section 4. The cylinder 63 and the plunger 64 are moved relatively to one another according to the communicating of a pressure medium to the cylinder 63. It is to be noted that the stroke in the cylinder 63 is comparatively long. When the pressure medium is introduced in the cylinder 63 in such a way as to push the plunger 64 outwardly from the cylinder 63, then the wing sections 4 are opened. When the plunger 64 works inwardly of the cylinder 63, then the wing sections 4 are closed. This floating mechanism 62 will permit manipulation and control of the opening of the mold in such a way that the wing sections 4 can be fully opened even though the tire sticks to one wing or the other. The control of the floating mechanism 62 is very sensitive to control so that it can be momentarily stopped and started again according to the sticking of the tire to the respective wing sections 4 and thereby the tire can be easily freed from either or both of the wing sections 4 without the necessity of manually prying the tire off the matrix of either of said sections. This action also facilitates the clamping of the tire in place when the mold is closed. The action of this floating mechanism 62 permits the equalization of forces in opening and closing the mold, and the proper balance for the separation of the matrices in the wing sections 4 from the tire periphery without injuring the design or freshly vulcanized crown of the tire periphery. The action of the opening and closing of the wing sections 4 by the floating mechanism 62 is particularly illustrated in Figs. 14 and 15.

The fastening of the wing sections 4 in the closed position is accomplished by an eccentric locking mechanism 72, shown in Fig. 1 and further illustrated in Figs. 17 and 18. On the free end of one of the wing sections 4 are provided a pair of bearing bushings 73 in bearings 74. Each bearing bushing 73 is concentric with the bearing 74 but the hole 76 in each bushing 73 is off-center with respect to the axis of said bearings 74 and bushings 73. The bearings 74 are spaced from each other respectively at the top and at the bottom of the end of the wing section 4. The ends 77 of a crank shaft are journaled in the holes 76 of the bearing bushings 73. An eccentric throw 78 of this crank shaft between the ends 77 is rotatable in the space between the bushings 73. Over this eccentric throw 78 is fitted a bearing 79, from which latter extend arms 81 supporting a bar 82 substantially parallel with the axis of the crank shaft bushings 73 and overlapping the end of the other wing section 4. On the end of this other wing section 4 are provided a pair of spaced hooks 83 facing away from the end of the wing sections 4 so that projecting ends of the bar 82 may be engaged with the spaced hooks 83 for drawing and clamping the free ends of the wing sections 4 together.

The upper end 77 of the crank shaft extends above the top bushing 73 and has a handle 84 fixed thereon for turning the crank shaft. When the handle 84 is turned in a clockwise direction viewing Fig. 17, then the eccentric throw 78 is thrown toward the other wing section 4 and it shifts the bar 82 out of engagement from the hooks 83, whereupon the bar 82 can be turned with the bearing 79 into an out-of-way position permitting the opening of the wing sections 4. When the wing sections 4 are closed, the bar 82 and arms 81 and bearings 79 are turned around on the eccentric throw 78 so as to place the ends of the bar 82 behind the hooks 83 of the other wing section 4. Thereafter by turning the handle 84 in a contra-clockwise direction and into the position shown in Fig. 17, the eccentric throw 78 is moved away from the end of the other wing section 4 and pulls the bar 82 tightly against the hooks 83 and thereby tightly clamps the end of the wing sections 4 together. The operation is very simple and positive and does not require any hydraulic tools or wrenches or other auxiliary mechanism for locking the open ends of the wing sections 4 together. The outer end of each bushing 73 has a flange 86 with peripheral serrations 87 thereon. A set screw 88 threaded into each the top and bottom of the wing section 4 engages one of said serrations 87 of each flange 86 to hold the respective bushings 73 against rotation. This renders the locking mechanism 72 adjustable to take up wear or looseness of the clamping mechanism 72. For this adjustment the screws 88 are removed and the bushings 73 are turned so as to shift the eccentric hole 76 and the ends 77 of the crank shaft therewith to a desired extent for adjusting the relative position of the bar 82. After the adjustment, the screws 88 are replaced to hold to the bushings 73 in the adjusted positions. In this manner, the clamping mechanism 72 can be always adjusted for locking the ends of the wing sections 4 with a desired tightness.

A centering plate 89 serves as a stand or support for the tire to hold it in position for engagement by the wing sections 4 of the mold. This plate 89 is held in position by pins 90 extended downwardly and guided in suitable tubular guides on the mold base 1. A hollow hub 91 of this plate 89 is provided with cross abutments 95 for engagement by a suitable cross head of a suitable lifting rod for moving the plate 89 upwardly substantially in the manner shown in Fig. 2. When this plate 89 is drawn against the sides of matrices in the mold sections after the mold is closed, it serves to reinforce the thinner sides and edges of such matrix sections.

A modified form of mounting and moving said centering and reinforcing plate 89 is shown in Fig. 16, which is movable toward and away from the bottom of the mold sections 3 and 4 also independently of the top plate. This plate is also used for centering the tire in the mold, namely the tire can rest on the plate 89 and be held in a position where it is in alignment with the curing cavities of the matrices in the mold sections 3 and 4, so that the mold can be accurately closed upon the tire in true aligned position. The end of a screw shaft 92 is fixedly secured, for instance by welding to the plate hub 91. The screw shaft 92 is threaded in a traveling nut 93, which nut 93 is slidable in a guide tube 94. A screw 96, extended through the side of the tube 94 and into a slot 97 in the side of the nut 93, prevents rotation of the nut 93 in the tube 94, but allows upward and downward sliding movement of said nut 93. The lower end of the screw shaft 92 is slidably extended through a hole 98 in the bottom of the guide tube 94. A stop flange 99 at the lower end of the screw shaft 92 limits the upward movement of the screw shaft 92 in the guide tube 94. The initial adjustment of the centering plate 89 is accomplished by rotating the plate 89 so as to raise it to the level where the tire is to be held in alignment with the matrices in the mold sections 3 and 4. After the tire is so held and engaged by the plate 89 and after the mold is closed, the centering plate 89 may be turned away from the tire or from the bottom of the matrix. In the hub 91 is provided a cross slot 101 for the purpose of engagement by a corresponding crosshead on a rod or the like for lifting the plate 89 up against the outer and lower faces of the matrices for reinforcing the latter.

Figure 2:
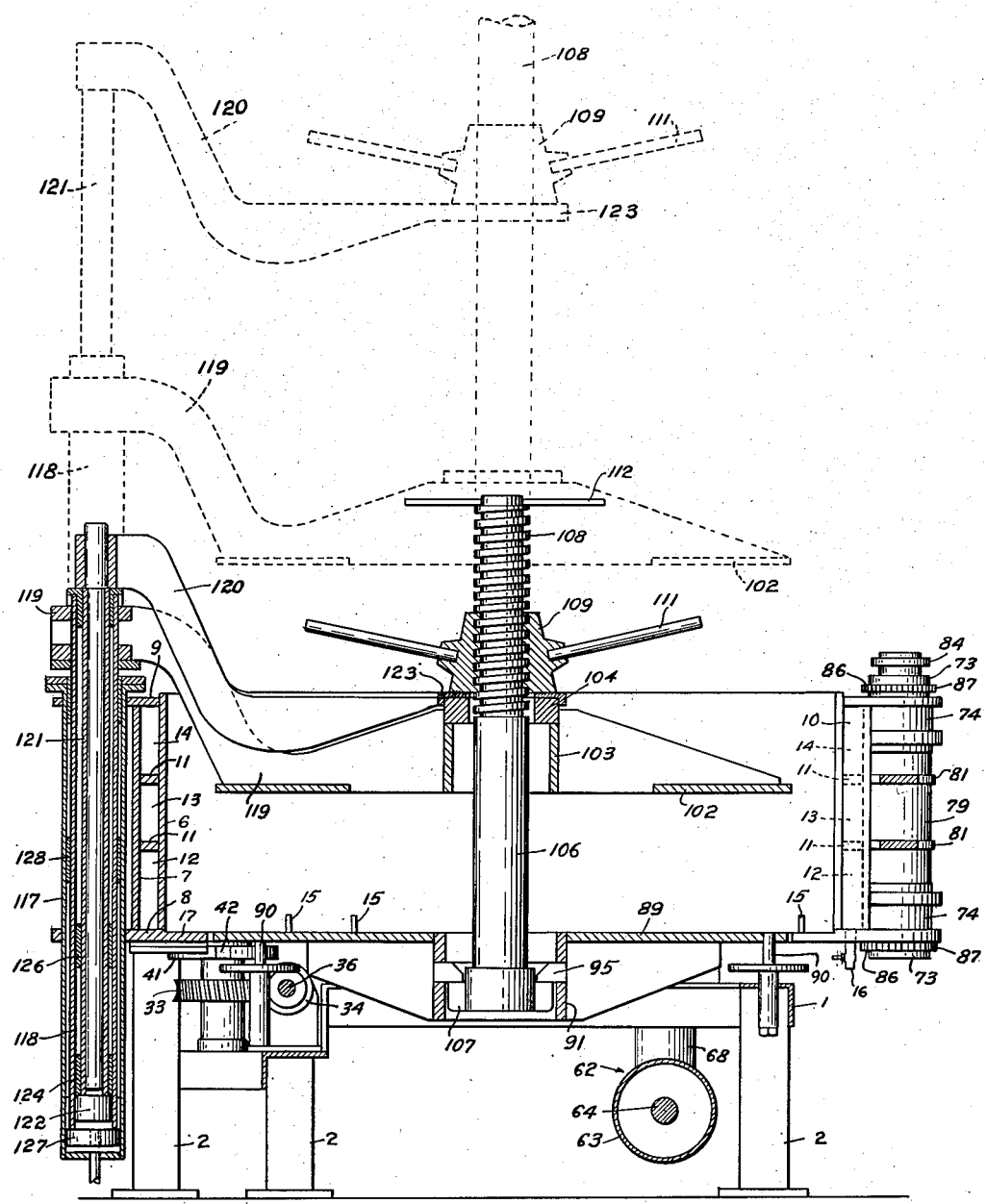
Fig. 2 is a cross sectional view of said mold.
Figures 3, 4:
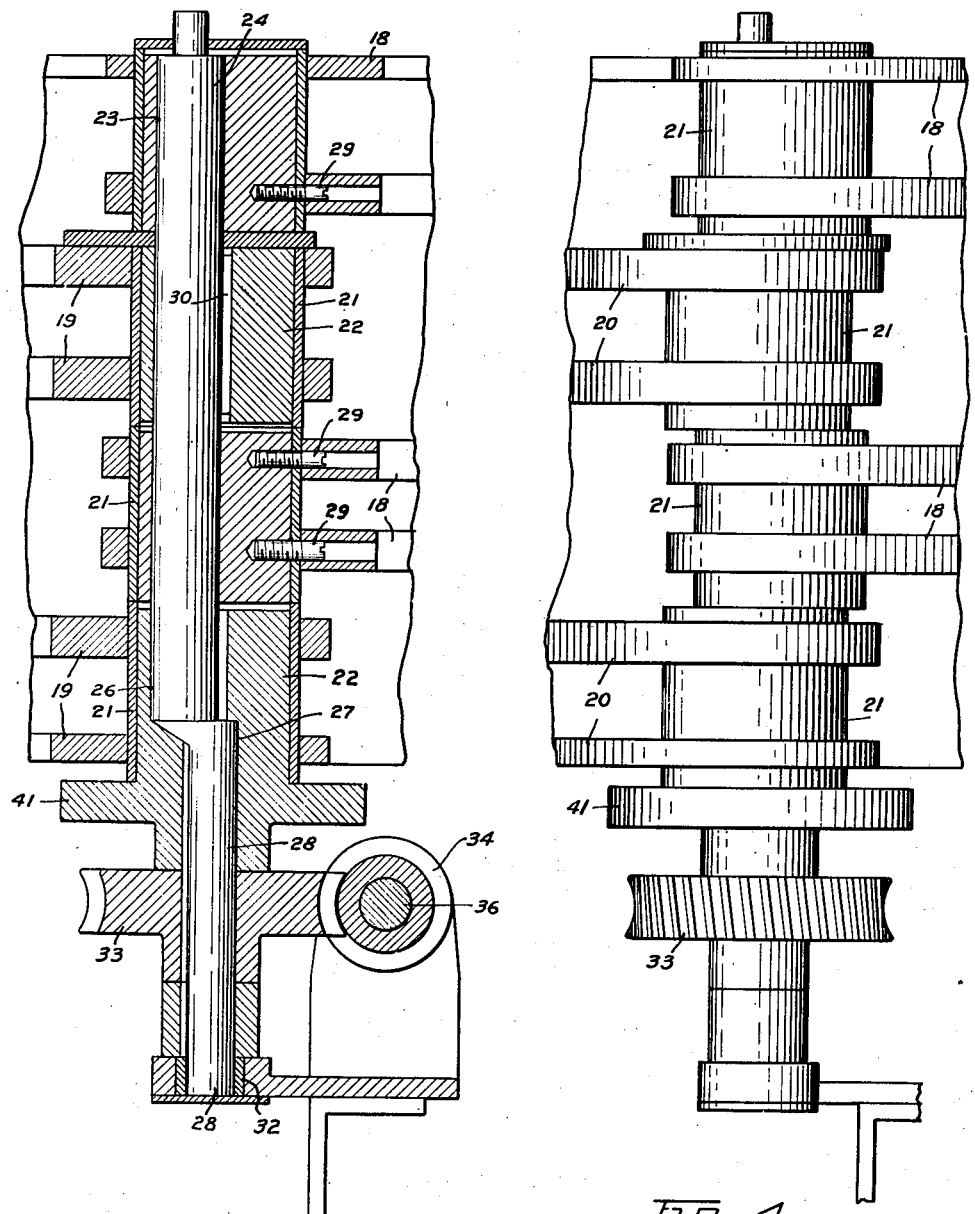
Fig. 3 is a sectional view of the hinge shifting mechanism of the mold.
Fig. 4 is another sectional view of said hinge shifting mechanism showing it in a position wherein the wing section is shifted.
Figure 5:
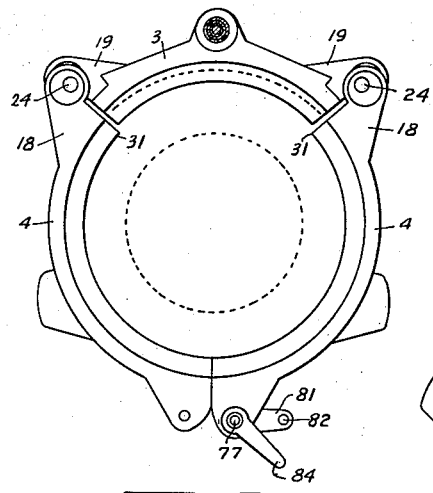
Fig. 5 is a somewhat diagrammatic plan view of the mold in the position where the hinged ends of the wing sections are shifted inwardly of the mold.
Figure 6:
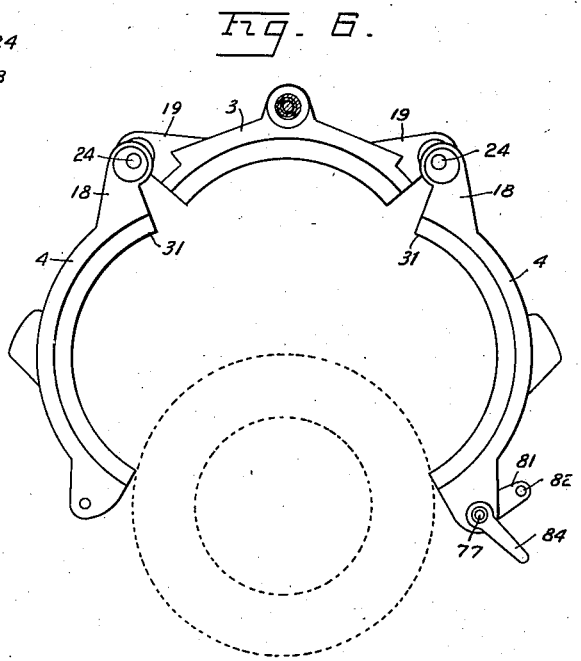
Fig. 6 is a somewhat diagrammatic view of the mold in open position.

A top reinforcing plate 102 is shown in Fig. 2. The position of the top plate 102 in Fig. 2 is as it would be used in connection with matrices substantially lower than the height of the mold sections 3 and 4. This top plate 102 also has a hollow hub 103 with an abutment 104 therein. Through this hollow hub 103 extends a rod 106, the lower end of which has a cross head 107 thereon for engagement with the cross abutment 95 in the hollow hub 91 of the bottom plate 89. The top of this rod 106 is threaded at 108. A nut 109 threaded on the rod 106 above the top of the hub 103 of the top plate 102 has handle bars 111 thereon so that when the top plate 102 is in position, by turning the nut 109 the rod 108 can be drawn upwardly so as to pull the lower hub 91 and the bottom plate 89 upwardly against the bottom flanges of the matrices in the mold sections 3 and 4. A cross bar 112 in the top of the rod 106 assists in turning the rod 106 so as to release or engage the cross head 107 with the cross abutment 95 in the bottom hub 91. There are suitable spaces or slots between the abutments 95 through which the cross head 107 can be inserted or removed, when the rod 106 is properly turned.

In this mold a device is provided for utilizing power for lifting the top plate 102 and the rod 106 into an out-of-way position. This lifting device includes a cylinder 117 vertically mounted on the stationary section 3. In this cylinder 117 works a tubular plunger 118 the top of which is connected by bracket arms 119 to the top plate 102. Inside the tubular plunger 118 works another plunger 121, which extends beyond the first tubular plunger 118 and has its top connected by another bracket arm 120 to a support 123 under the nut 109 on the rod 106. On the lower end of the inner plunger 121 is a head 122. A slidable bearing 124 is provided above said head 122 so as to move with the inner plunger 121 upwardly until said bearing 124 hits a stop 126 extending inwardly from the outward tubular plunger 118. After such abutment the pressure will raise both the inner and outer plungers together. The outer plunger 118 also has a head 127 at its lower end which after a certain stroke will abut a fixed bearing 128 on the inner periphery cylinder 117 to limit the upward stroke. Pressure medium is admitted to both cylinders simultaneously through holes in the bottom of the cylinder 117 and through head 127 of the outer plunger 118, but the area to which this pressure is applied at the inner plunger 121 is relatively greater in proportion to the weight it carries than the same pressure as applied against the head 127 of the outer plunger 118. The application of pressure therefore first raises the inner plunger 121 and the rod 106 therewith so as to withdraw the rod 106 to the limit of the upward stroke of the inner plunger 121, and then the entire force of the pressure is applied to the outer plunger 118 for lifting the heavier weight of the top plate 102 as well as the rod 106. The rod 106, the plate 102 and the plungers 118 and 121 in the lifted position are indicated in broken lines in Fig. 2, at which place they are in out-of-way position permitting the opening of the mold and the removal of the tire. The operation of this double plunger lifting structure is controlled by suitable valves and vents not shown.

Figure 14:
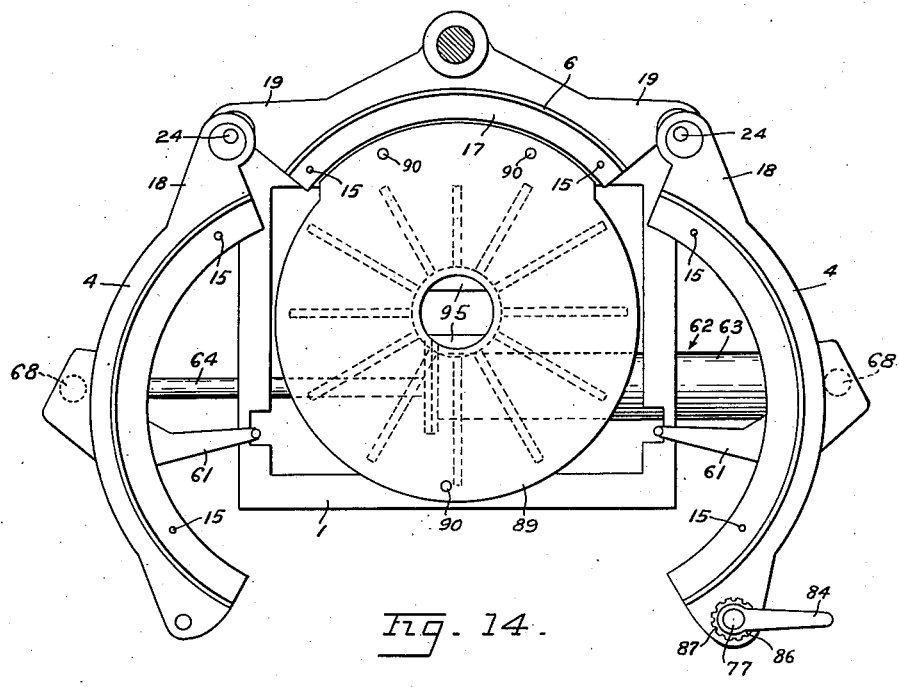
Fig. 14 is a plan view showing the mold open, and the supports for the wing sections and the bottom supporting elements.
Figure 15:
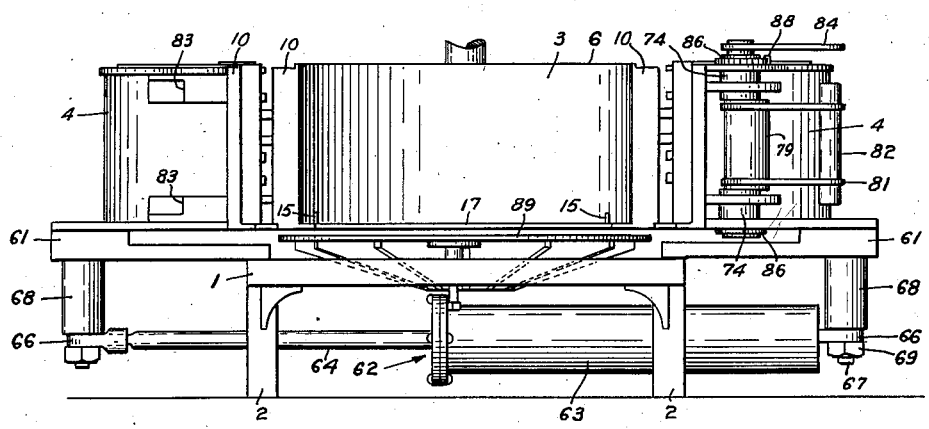
Fig. 15 is a front view of the mold in the position shown in Fig. 14.

In operation the wing sections 4 of the mold are opened. Suitable matrix sections are placed on the bottom flanges of the mold sections. Then the bottom plate 89 is adjusted in position and the tire to be vulcanized is placed thereon and properly centered. Thereafter the pneumatic closing mechanism 62 is actuated through suitable valves to close the wing sections 4 around the periphery of the tire. Preferably before the ends of the wing sections 4 are clamped together tightly, the system of links 47 is actuated by pulling the operating bar 48 to actuate the hinge shifting mechanism for shifting the hinges from the position shown in Fig. 7 into the position shown in Fig. 8 and thereby drawing the tire tightly against the stationary section 3 and in the same continuous movement to return the hinged corners of the wing sections 4 to the initial aligned positions as shown in Fig. 12. During this operation the pneumatic mechanism 62 holds the wing sections 4 in closed position. Then the clamping mechanism 72 is applied to tightly draw the free ends of the wing sections 4 together. Then the top plate 102 is lowered upon the top of the matrix and the rod 106 is moved into engagement with the hub of the bottom plate 89 in the manner heretofore described. By turning the nut 109, the plates 89 and 102 are tightly held in their reinforcing positions. Thereafter, heat is admitted into the mold sections through suitable flexible piping 129 as shown in Fig. 1, and the heating medium, such as steam, is circulated through said mold sections in the manner heretofore described. After the tire is cured for the desired length of time, the operating bar 48 of the link system 47 is pulled again for releasing the hinges of the wing sections and shifting them again half a revolution namely from the position shown in Fig. 12 to the position shown in Fig. 13, thus stripping the tire away from the stationary sections 3, and shifting back again to the position shown in Fig. 7 ready for the next operation, at which latter position the shifting is automatically stopped in the manner heretofore described. Before this hinge shifting, the clamp mechanism 72 may be preferably disengaged or opened. Thereafter the pneumatic opening mechanism 62 is operated intermittently for exerting equalized pull on the movable wing sections 4 for completely opening the same and loosening them from the cured tire. After the mold is opened the tire can be removed laterally because as shown in Fig. 14 the opening mechanism opens this mold to sufficient width for the lateral removal of the tire. The mold is then ready for repeating the aforesaid operation.

We claim:

1. In a vulcanizer mold of the character described, a stationary mold section, a swingable wing section at each end of the stationary mold section, hinge means to connect an end of each wing section to an end of the stationary section, and said hinge means including a rotatable pivot, and connecting elements between the pivot and the hinged end of its wing section to impart gyrating movement to said hinged end inwardly and outwardly with respect to the inner periphery of the mold and of the stationary section respectively to push the tire away from the stationary section and to permit the pushing of the tire against said stationary section as said pivot is rotated.

2. In a vulcanizer mold of the character described, a stationary mold section, a swingable wing section at each end of the stationary wing section, hinge means to connect an end of each wing section to an end of the stationary section, said hinge means including a rotatable pivot, and connecting elements between the pivot and hinged end of its wing section to impart gyrating movement to said hinged end inwardly and outwardly with respect to the inner periphery of the mold and of the stationary section respectively to push the tire away from the stationary section and to permit the pushing of the tire against said stationary section as said pivot is rotated, and means to predetermine the rotation of said rotation of said rotating means and the shifting of said hinge means in either direction.

3. In a vulcanizer mold of the character described, a stationary mold section, a swingable mold section at each end and in continuation of the stationary mold section, a hinge device connecting each swingable mold section to the adjacent end of the stationary mold section, said hinge device including a rotatable element and connecting members between said rotatable element and the hinged end of each swingable section eccentric with respect to the axis of rotation of said element to shift said hinged end on a substantially circular path inwardly and away from the adjacent end of the stationary section during the first half of each revolution of said element and outwardly and back to the initial position during the other half of each revolution of said element, and a control mechanism to control said rotation and to stop said rotation and shifting after each half revolution.

4. In a vulcanizer mold of the character described, a plurality of mold sections forming a complete mold when closed, a hinge connection between said sections for opening and closing the mold, a rotatable element eccentric with respect to its axis of rotation forming a shifting pivot in each hinge connection and members in each hinge connection for converting said shifting of said pivot into shifting of the hinged end of one section relatively to the adjacent end of the next section when said element is rotated.

5. In a vulcanizer mold of the character described, a plurality of mold sections forming a complete mold when closed, a hinge connection between said sections for opening and closing the mold, a rotatable element eccentric with respect to its axis of rotation forming a shifting pivot in each hinge connection and members in each hinge connection for converting said shifting of said pivot into shifting of the hinged end of one section relatively to the adjacent end of the next section when said element is rotated, and means simultaneously to rotate said elements in all of said hinge connections.

6. In a vulcanizer mold of the character described, a plurality of mold sections forming a complete mold when closed, a hinge connection between said sections for opening and closing the mold, a rotatable element eccentric with respect to its axis of rotation forming a shifting pivot in each hinge connection and members in each hinge connection for converting said shifting of said pivot into shifting of the hinged end of one section relatively to the adjacent end of the next section when said element is rotated, and a control mechanism to rotate said elements simultaneously in all hinge connections one half of a revolution for each shifting of said ends of said sections.

7. In a vulcanizer of the character described, a plurality of mold sections movable relatively to one another for opening and closing said mold, a hinge connection between adjacent ends of adjacent sections including, an eccentric pivot element, members around each eccentric element connected to the movable sections for shifting the adjacent hinged ends of the movable sections from an initial aligned position to inward projection of one end with respect to the adjacent end and then to outward projection of said end with respect to its adjacent end when said eccentric element is rotated, means to rotate said eccentric elements simultaneously, and a control mechanism to actuate said rotating means and to limit the eccentric movement to one half revolution from said initial position at one actuation and to the other half revolution at the next actuation.

8. In a vulcanizer of the character described, a stationary mold section, a movable mold section at each end of said stationary mold section forming a full circle mold when the movable sections are closed together, a hinge connection between each end of said stationary section and the end of the adjacent movable section, including, a rotatable pivot element eccentric with respect to its axis of rotation, connecting members between said eccentric element and said hinged end for shifting said hinged end of the movable section from an aligned position inwardly of the mold and away from said stationary section during one half revolution of said eccentric element and outwardly of the mold and back to the aligned position during the second half of each revolution of said element, means to rotate said eccentric elements, and an actuating and control mechanism to actuate said rotating means and to limit the rotation of said eccentric elements to the respective half revolutions after each actuation.

9. In a tire vulcanizer of the character described, a stationary mold section, a movable mold section at each end of said stationary mold section, a hinge connection between each end of the stationary section and the adjacent end of each movable section, said hinge connection including a plurality of aligned cam elements having aligned holes therethrough off center with respect to the axis of the hinge, certain of said elements being fixedly connected to the movable section and the other elements being rotatably held on the hinge of the adjacent end of the stationary section, a crank shaft having its throw extended through said aligned holes, means to rotate said crank shaft for rotating said cam elements in the hinge of said stationary section and to shift the hinged end of said movable section from an initial aligned position inwardly of the mold and then to an aligned position spaced from the stationary section in one half of each revolution, and then outwardly of the mold from said last aligned position and back to the first aligned position during the other half of each revolution of said crank shaft, and an actuating and control mechanism to actuate said rotating means and to limit each shifting movement to said respective half revolutions of said crank shaft.

10. In a tire vulcanizer of the character described, a stationary mold section, a movable mold section at each end of said stationary mold section, a hinge connection between each end of the stationary section and the adjacent end of each movable section, said hinge connection including a plurality of aligned cam elements having aligned holes therethrough off center with respect to the axis of the hinge, certain of said elements being fixedly connected to the movable section and the other elements being rotatably held on the hinge of the adjacent end of the stationary section, a crank shaft having its throw extended through said aligned holes, means to rotate said crank shaft for rotating said cam elements in the hinge of said stationary section and to shift the hinged end of said movable section from an initial aligned position inwardly of the mold and then to an aligned position spaced from the stationary section and then outwardly of the mold from said last aligned position and back to the first aligned position during each revolution of said crank shaft, means to actuate said rotating means, means to limit the rotation of said crank shaft to one half revolution for each actuation, and a mechanism to control said actuating and limiting means.

11. In a tire vulcanizer of the character described, a stationary mold section, a movable mold section at each end of said stationary mold section, a hinge connection between each end of the stationary section and the adjacent end of each movable section, said hinge connection including a plurality of aligned cam elements having aligned holes therethrough off center with respect to the axis of the hinge, certain of said elements being fixedly connected to the movable section and the other elements being rotatably held on the hinge of the adjacent end of the stationary section, a crank shaft having its throw extended through said aligned holes, means to rotate said crank shaft for rotating said cam elements in the hinge of said stationary section and to shift the hinged end of said movable section from an initial aligned position inwardly of the mold and then to an aligned position spaced from the stationary section and then outwardly of the mold from said last aligned position and back to the first aligned position during each revolution of said crank shaft, a releasable catch device to automatically engage and hold said hinge connection in said initial position and in said aligned spaced position, and a mechanism to release said catch device and actuate said rotating means and to render said rotating means inoperative when said catch device engages said hinge connection.

12. In a tire vulcanizer of the character described, a stationary mold section, a movable mold section at each end of said stationary mold section, a hinge connection between each end of the stationary section and the adjacent end of each movable section, said hinge connection including a plurality of aligned cam elements having aligned holes therethrough off center with respect to the axis of the hinge, certain of said elements being fixedly connected to the movable section and the other elements being rotatably held on the hinge of the adjacent end of the stationary section, a crank shaft having its throw extended through said aligned holes, means to rotate said crank shaft for rotating said cam elements in the hinge of said stationary section and to shift the hinged end of said movable section from an initial aligned position inwardly of the mold and then to an aligned position spaced from the stationary section and then outwardly of the mold from said last aligned position and back to the first aligned position during each revolution of said crank shaft, one of the elements connected to said crank shaft having diametrically opposite detents thereon, a releasable catch device to automatically engage one of said detents when said movable mold section is in said initial position and the other detent when said movable mold section is in said spaced aligned position; and a control mechanism for releasing said catch mechanism and starting said rotating means and thereafter for stopping said rotating means when said catch device is automatically re-engaged with either of said detents after each half revolution of said crank shaft from said initial position.

13. In a tire vulcanizer of the character described, a stationary mold section, a movable mold section at each end of said stationary mold section, a hinge connection between each end of the stationary section and the adjacent end of each movable section, said hinge connection including a plurality of aligned cam elements having aligned holes therethrough off center with respect to the axis of the hinge, certain of said elements being fixedly connected to the movable section and the other elements being rotatably held on the hinge of the adjacent end of the stationary section, a crank shaft having its throw extended through said aligned holes, means to rotate said crank shaft for rotating said cam elements in the hinge of said stationary sections and to shift the hinged end of said movable section from an initial aligned position inwardly of the mold and then to an aligned position spaced from the stationary section and then outwardly of the mold from said last aligned position and back to the first aligned position during each revolution of said crank shaft, one of the elements connected to said crank shaft having diametrically opposite detents thereon, a releasable catch device to automatically engage one of said detents when said movable mold section is in said initial position and the other detent when said movable mold section is in said spaced aligned position; and a control mechanism for releasing said catch mechanism and starting said rotating means and thereafter for stopping said rotating means when said catch device is automatically re-engaged with either of said detents after each half revolution of said crank shaft from said initial position, said control mechanism including a system of links connected to the catch devices at both movable section hinges and to an electric circuit control, said rotating means being controlled by said electric circuit control.

14. In a vulcanizing mold of the character described, a stationary mold section, a swingable mold section at each end of said stationary mold section, and a power actuated opening mechanism connected to and supported solely on said swingable sections to apply opposite forces to said swingable sections for opening and closing the same.

15. In a vulcanizing mold of the character described, a stationary mold section, a wing section swingably mounted at each end of said stationary section, a cylinder, a piston working in said cylinder, said cylinder being pivotally connected to one of said wing sections and said piston being pivotally connected to the other wing section, said cylinder and said piston being supported on said wing sections and both being movable, and exerting respectively opposite forces on said wing sections for opening and closing of said mold.

16. In a vulcanizing mold of the character described, a stationary mold section, a wing section swingably mounted at each end of said stationary section being movable into mold closing and opening positions, a cylinder and plunger mechanism operated by a pressure medium and freely suspended from said wing sections, said cylinder being connected to one wing section and said piston to the other wing section substantially parallel with a chord of the circle of the mold for exerting opposite forces on said wing sections for opening and closing said mold.

17. In a vulcanizing mold of the character described, a base, a stationary mold section on the base, a wing section swingably mounted at each end of the stationary mold section, relatively movable power operated elements beneath the base suspended from said wing sections, both elements being movable relatively to said base, each element being connected to one of said wing sections for moving said wing sections outwardly into open position when said elements are moved outwardly from each other and into closed position when said elements are moved together.

18. In a vulcanizing mold of the character described, a base, a stationary mold section on the base, wing sections swingably mounted at the opposite ends of the stationary section to complete the mold, a cylinder and plunger mechanism operated by a pressure medium for moving said cylinder and plunger relatively to one another, means to connect said cylinder to one wing section, and means to connect said plunger to the other wing section, said cylinder and plunger mechanism being freely supported on said wing sections only for free relative movement of said plunger and cylinder for exerting opening and closing forces on said wing sections.

19. In a vulcanizing mold of the character described, a base, a stationary mold section on the base, wing sections swingably mounted at the opposite ends of the stationary section to complete the mold, a cylinder and plunger mechanism operated by a pressure medium for moving said cylinder and plunger relatively to one another, means to pivotally connect said cylinder to one wing section, and means to pivotally connect said plunger to the other wing section, said cylinder and plunger mechanism being freely supported on said wing sections only for free relative movement of said plunger and cylinder for exerting opening and closing forces on said wing sections.

20. In a vulcanizing mold of the character described, a stationary mold section, a swingable mold section at each end of said stationary mold section, and a power actuated opening mechanism connected to and supported solely on said swingable sections to apply opposite forces to said swingable sections for opening and closing the same, hinge means connecting each swingable mold section to said stationary section, and including a shifting device in each hinge means eccentric with respect to the axis of its hinge for shifting the hinged end of each swingable section inwardly and outwardly of the mold respectively to urge the tire away from or toward said stationary section when said swingable sections are held in position by said opening mechanism.

21. In a vulcanizing mold of the character described, a stationary mold section, a swingable mold section at each end of said stationary mold section, and a power actuated opening mechanism connected to and supported solely on said swingable sections to apply opposite forces to said swingable sections for opening and closing the same, hinge means connecting each swingable mold section to said stationary section, and including a shifting device in each hinge means eccentric with respect to the axis of its hinge for shifting the hinged end of each swingable section inwardly and outwardly of the mold respectively to urge the tire away from or toward said stationary section when said swingable sections are held in position by said opening mechanism, and means to actuate and control said eccentric shifting mechanism while said opening mechanism holds said swingable mold sections in adjusted position.

ROBERT A. McCLOUD.
JOHN L. DAUM.
THOMAS P. BACON.

REFERENCES CITED

The following references are of record in the file of this patent:

UNITED STATES PATENTS

| Number | Name | Date |
|---|---|---|
| 1,996,971 | Murphy | Apr. 9, 1935 |
| 2,038,213 | Frank | Apr. 21, 1936 |
| 2,147,339 | Glynn | Feb. 14, 1939 |
| 2,174,188 | Heintz | Sept. 26, 1939 |
| 2,339,696 | Hawkinson | Jan. 18, 1944 |
| 2,345,172 | Bacon | Mar. 28, 1944 |
| 2,370,655 | Glynn | Mar. 6, 1945 |
| 2,372,644 | Bacon | Apr. 3, 1945 |